(12) United States Patent
Honda et al.

(10) Patent No.: US 10,253,736 B2
(45) Date of Patent: Apr. 9, 2019

(54) FUEL PUMP

(71) Applicant: AISAN KOGYO KABUSHIKI KAISHA, Obu-shi (JP)

(72) Inventors: Yoshihiko Honda, Obu (JP); Akira Hamajima, Obu (JP); Yoshiki Kamio, Obu (JP)

(73) Assignee: Aisan Kogyo Kabushiki Kaisha, Obu-Shi (JP)

( * ) Notice: Subject to any disclaimer, the term of this patent is extended or adjusted under 35 U.S.C. 154(b) by 185 days.

(21) Appl. No.: 15/112,347

(22) PCT Filed: Nov. 14, 2014

(86) PCT No.: PCT/JP2014/080224
§ 371 (c)(1),
(2) Date: Jul. 18, 2016

(87) PCT Pub. No.: WO2015/111286
PCT Pub. Date: Jul. 30, 2015

(65) Prior Publication Data
US 2016/0333833 A1 Nov. 17, 2016

(30) Foreign Application Priority Data
Jan. 27, 2014 (JP) .................. 2014-012724

(51) Int. Cl.
*H02K 11/00* (2016.01)
*F02M 37/08* (2006.01)
(Continued)

(52) U.S. Cl.
CPC ............ *F02M 37/08* (2013.01); *F02M 37/10* (2013.01); *F04D 3/005* (2013.01); *F04D 29/181* (2013.01);
(Continued)

(58) Field of Classification Search
CPC .......... H02K 5/08; H02K 5/225; H02K 11/40; F02M 37/10; F02M 37/08; F04D 3/005; F04D 29/181
USPC ........................................... 310/71
See application file for complete search history.

(56) References Cited

U.S. PATENT DOCUMENTS 6,528,913 B1 * 3/2003 Michaels ................. H02K 3/50
310/71
7,497,208 B2 3/2009 Satoh et al.
(Continued)

FOREIGN PATENT DOCUMENTS

JP H07-310692 A 11/1995
JP 2001-115917 A 4/2001
(Continued)

OTHER PUBLICATIONS

Japanese Office Action for JP Patent App. No. 2014-012724 dated Apr. 4, 2017 (13 pages including English ttranslation).
(Continued)

*Primary Examiner* — Hanh N Nguyen
(74) *Attorney, Agent, or Firm* — Shumaker, Loop & Kendrick, LLP

(57) ABSTRACT

A fuel pump may be driven by a brushless motor. The fuel pump may include a core; three supplying terminals configured to supply electric power to a coil wire fixed to the core and wound around the core; a resin layer holding the three supplying terminals; and a ground terminal held by the resin layer in a state of being insulated from the three supplying terminals, wherein the ground terminal may be electrically connected to a control circuit configured to control electric power supplied to the three supplying terminals.

7 Claims, 11 Drawing Sheets

(51) Int. Cl.
- *F02M 37/10* (2006.01)
- *H02K 3/52* (2006.01)
- *H02K 5/08* (2006.01)
- *H02K 7/14* (2006.01)
- *H02K 11/40* (2016.01)
- *F04D 3/00* (2006.01)
- *F04D 29/18* (2006.01)
- *H02K 5/22* (2006.01)

(52) U.S. Cl.
CPC ............... *H02K 3/522* (2013.01); *H02K 5/08* (2013.01); *H02K 5/225* (2013.01); *H02K 7/14* (2013.01); *H02K 11/40* (2016.01)

(56) References Cited

U.S. PATENT DOCUMENTS

| | | | | |
|---|---|---|---|---|
| 8,734,133 | B2* | 5/2014 | Tanahashi | F04D 5/002 310/71 |
| 2002/0163263 | A1 | 11/2002 | Uffelman | |
| 2008/0011276 | A1* | 1/2008 | Satoh | F02M 37/106 123/509 |
| 2011/0020154 | A1* | 1/2011 | Matsuda | H02K 1/148 417/410.1 |
| 2011/0080062 | A1* | 4/2011 | Noh | H02K 3/522 310/71 |
| 2013/0119799 | A1 | 5/2013 | Honda et al. | |

FOREIGN PATENT DOCUMENTS

| | | |
|---|---|---|
| JP | 2003-042030 A | 2/2003 |
| JP | 2008-038901 A | 2/2008 |
| JP | 2013-104398 A | 5/2013 |

OTHER PUBLICATIONS

International Search Report for PCT/JP2014/080224 dated Dec. 16, 2014 (4 pages including English translation).

English translation of Written Opinion for PCT/JP2014/080224 dated Aug. 11, 2016 (10 pages).

* cited by examiner

FUEL PUMP

TECHNICAL FIELD

The present specification discloses a fuel pump.

BACKGROUND ART

Japanese Patent Application Publication No. 2013-104398 discloses a fuel pump. The fuel pump includes a rotor having a shaft; a bearing rotatably supporting the shaft; a reference terminal whose electrical potential is maintained lower than an electrical potential of the bearing; a stator; and a plurality of supplying terminals configured to supply current to the stator. The reference terminal and the plurality of supplying terminals are fixed to a lid member of the fuel pump by insert molding.

SUMMARY OF INVENTION

Technical Problem

In a control circuit configured to control a fuel pump, it is desirable that the control circuit is grounded in order to reduce effects of switching noise that is generated by switching by which power supply to U, V, and W phases of the fuel pump is switched.

The present specification provides a technology in which a ground terminal configured to ground a control circuit is appropriately placed in a fuel pump.

Solution to Technical Problem

A fuel pump disclosed in the present specification is driven by a brushless motor. The fuel pump comprises a core; a plurality of supplying terminals configured to supply electric power to a coil wire fixed to the core and wound around the core; a fixing member holding the plurality of the supplying terminals; and a ground terminal held by the fixing member in a state of being insulated from the plurality of the supplying terminals, wherein the ground terminal is electrically connected to a control circuit configured to control electric power supplied to the plurality of the supplying terminals.

According to this configuration, the ground terminal connected to the control circuit, can be held by the fixing member holding the plurality of supplying terminals, and can be placed in the fuel pump in a state of being insulated from the plurality of supplying terminals. For this reason, the ground terminal configured to ground the control circuit can be appropriately placed in the fuel pump.

DESCRIPTION OF EMBODIMENTS

Some of major characteristics of the embodiments that will be described are listed below. It should be noted that the respective technical elements described below are independent of one another and provide technical utility either alone or in various combinations.

The fuel pump may further comprise a conducting portion configured to conduct between the plurality of the supplying terminals and the coil wire. The ground terminal may electrically shield at least a part of the conducting portion. This configuration makes it possible to prevent switching noise generated in the control circuit from being emitted from the conducting portion to an outside of the fuel pump (so-called emission noise).

The fuel pump may further comprise at least one metal member. The ground terminal may be electrically connected to the at least one metal member. This configuration can get the ground terminal to be grounded via the at least one metal member.

The ground terminal may be in contact with the at least one metal member in a state where at least a part of the ground terminal is elastically deformed. This configuration can get the ground terminal to be appropriately brought into contact with the metal member by a restoring force of the ground terminal.

The fuel pump may further comprise a spring member made of a conductive material. The ground terminal may be in contact with the spring member. The spring member may be in contact with the at least one metal member. This configuration can get the ground terminal to be appropriately grounded via the spring member.

The ground terminal may be directly in contact with the at least one metal member. This configuration eliminates a need to provide a component for electrically connecting the ground terminal and the metal member.

The fuel pump may further comprise at least one metal member. The ground terminal may comprise: a terminal portion sticking out above the fuel pump and configured to electrically connect to the control circuit; a contacting portion being in contact with the at least one metal member; a held portion held by the fixing member, and a joining member joining the terminal portion, the contacting portion and the held portion. This configuration can get the control circuit to be easily connected to the ground terminal by using the terminal portion sticking out above the fuel pump. Due to this, the control circuit can be easily grounded via the ground terminal.

The joining member may be elastically deformable. This configuration can get the ground terminal and the metal member to be appropriately brought into contact with each other by a restoring force of the joining member.

First Embodiment

Figure 2:
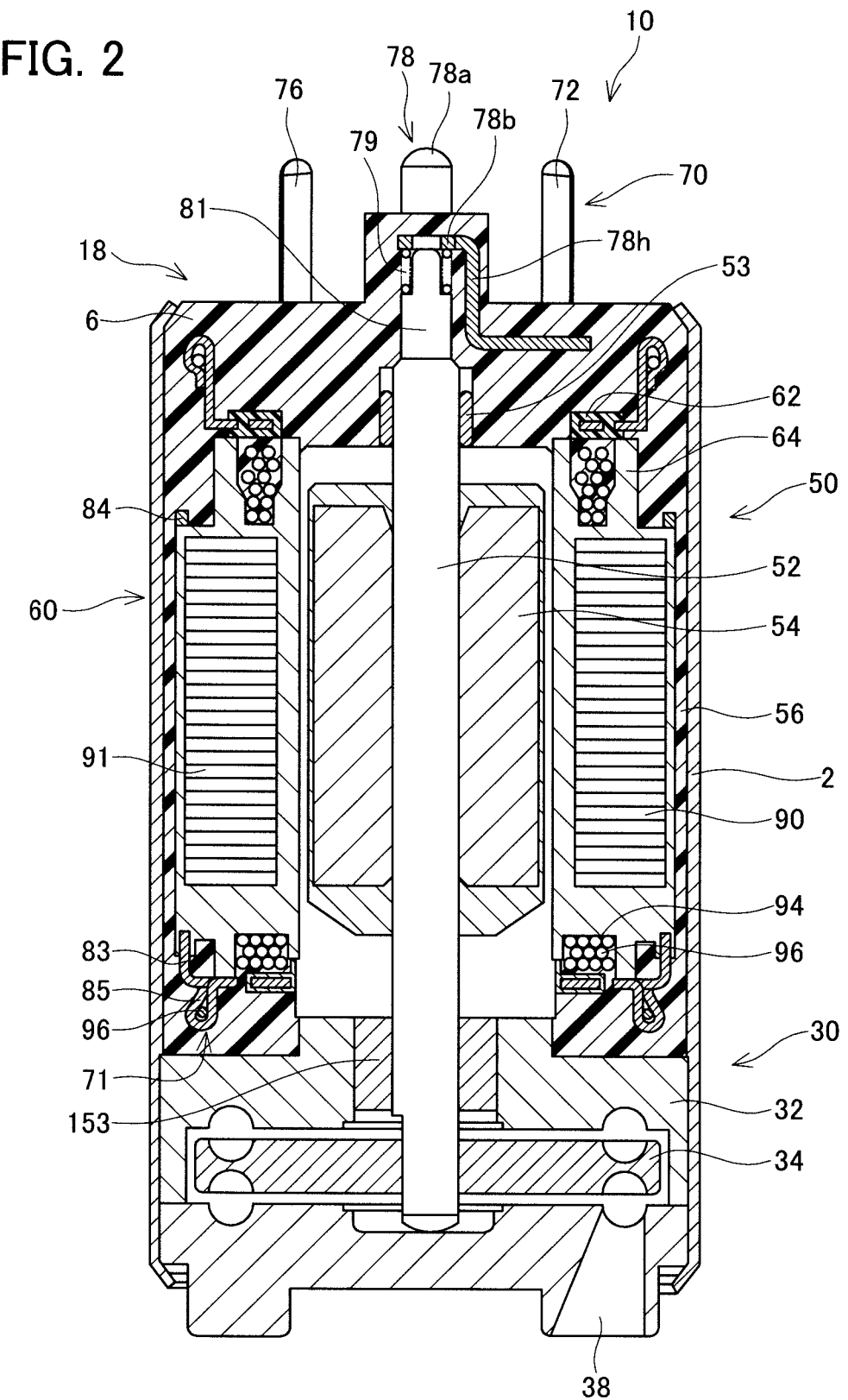
FIG. 2 is a longitudinal sectional view of the fuel pump according to the first embodiment.

As shown in FIG. 2, a fuel pump 10 is placed inside a fuel tank (not illustrated) and supplies fuel (e.g. gasoline) to a vehicle engine (not illustrated) e.g. an automobile engine. The fuel pump 10 comprises a motor section 50 and a pump section 30. The motor section 50 and the pump section 30 are placed inside a housing 2. The housing 2 has a cylindrical shape with openings at its both ends. The housing 2 is made of metal (e.g., stainless steel). The fuel pump 10 is grounded via the housing 2.

As shown in FIG. 2, the pump section 30 comprises a casing 32 and an impeller 34. The casing 32 closes an opening at a lower end of the housing 2. An inlet 38 is provided at a lower end of the casing 32. At an upper end of the casing 32, a communicating hole (not illustrated) that connects an inside of the casing 32 and the motor section 50 is provided. The casing 32 is made of metal (e.g., stainless steel). The impeller 34 is housed in the casing 32. The casing 32 is in direct contact with and electrically connected to the housing 2.

The motor section 50 is located above the pump section 30. The motor section 50 is a brushless motor. The motor section 50 is a three-phase motor. The motor section 50 comprises a rotor 54 and a stator 60. The rotor 54 comprises a permanent magnet. A shaft 52 penetrates a center of the rotor 54 and is fixed thereto. A lower end of the shaft 52 is inserted into a center of the impeller 34 and penetrates the impeller 34. The shaft 52 is made of metal (e.g., stainless steel). The shaft 52 is electrically connected to the casing 32 via a bearing. The rotor 54 is rotatably supported about the shaft 52 by bearings 53 and 153 disposed at both ends of the shaft 52. The bearing 53 is disposed at an upper end of the shaft 52 and the bearing 153 is disposed at the lower and of the shaft 52. The rotor 54 and the bearings 53 and 153 are made of metal (e.g., stainless steel). It should be noted that in the embodiment, a state of FIG. 2 defines a vertical positional relationship used herein. That is, the pump section 30 is located "lower" than the motor section 50 and the motor section 50 is located "higher" than the pump section 30.

The stator 60 is disposed on an outer circumference of the rotor 54. Upper and lower ends of the stator 60 are covered with an external resin layer 6. The stator 60 is press-fit in the housing 2 in a state of being covered with the external resin layer 60. The external resin layer 6 closes an opening at an upper end of the housing 2. An outlet (not illustrated) is provided at an upper end of the external resin layer 6. The outlet communicates the motor section 50 and a fuel passage (not illustrated) located outside the fuel pump 10. The outlet is an opening through which fuel having been pressurized in the pump section 30 is supplied to the engine via the fuel passage.

The stator 60 comprises a core 90, a resin layer 64 covering the core 90, coil wires 96, a terminal member 70 for a stator (hereinafter, called a stator terminal member 70), and a common terminal 71. The core 90 is configured of a plurality of stacked core plates. The core 90 is made of metal (e.g., a magnetic steel sheet). It should be noted that in preference of viewability, FIG. 2 shows cross-sections of the coil wires 96 and the plurality of core plates in blank. The core 90 comprises an annular portion 91 and six teeth 94. The annular portion 91 has a cylindrical shape. The six teeth 94 are placed at regular intervals on an inner circumferential surface of the annular portion 91. Each of the six teeth 94 extends from the inner circumferential surface of the annular portion 91 toward a central axis of the annular portion 91. The rotor 54 is disposed at a center of the annular portion 91.

The teeth 94 are arranged along an outer circumferential surface of the rotor 54. An inner circumferential end of each of the teeth 94 is formed so as to conform to the outer circumferential surface of the rotor 54. Around an intermediate part between the inner and outer circumferential ends of each of the teeth 94, the corresponding coil wire 96 is wound with the resin layer 64 sandwiched between the teeth 94 and the coil wire 96. The coil wires 96 are coated with an insulation film. In FIG. 2, only one of the teeth 94 and the coil wire 96 wound around the one tooth 94 are given reference numbers, however, the coil wires 96 are wound around the other teeth 94 as well.

When electric power is supplied to the stator 60, the six teeth 94 are categorized into two U-phase teeth 94, two V-phase teeth 94, and two W-phase teeth 94 according to a phase of electric current that is supplied to the coil wires 96. The coil wires 96 wound around the two U-phase teeth 94 are electrically connected to each other by a supplying terminal 72 to be described later. Similarly, the coil wires 96 wound around the two V-phase teeth 94 are electrically connected to each other by a supplying terminal 74 to be described later, and the coil wires 96 wound around the two W-phase teeth 94 are electrically connected to each other by a supplying terminal 76 to be described later.

Figure 1:
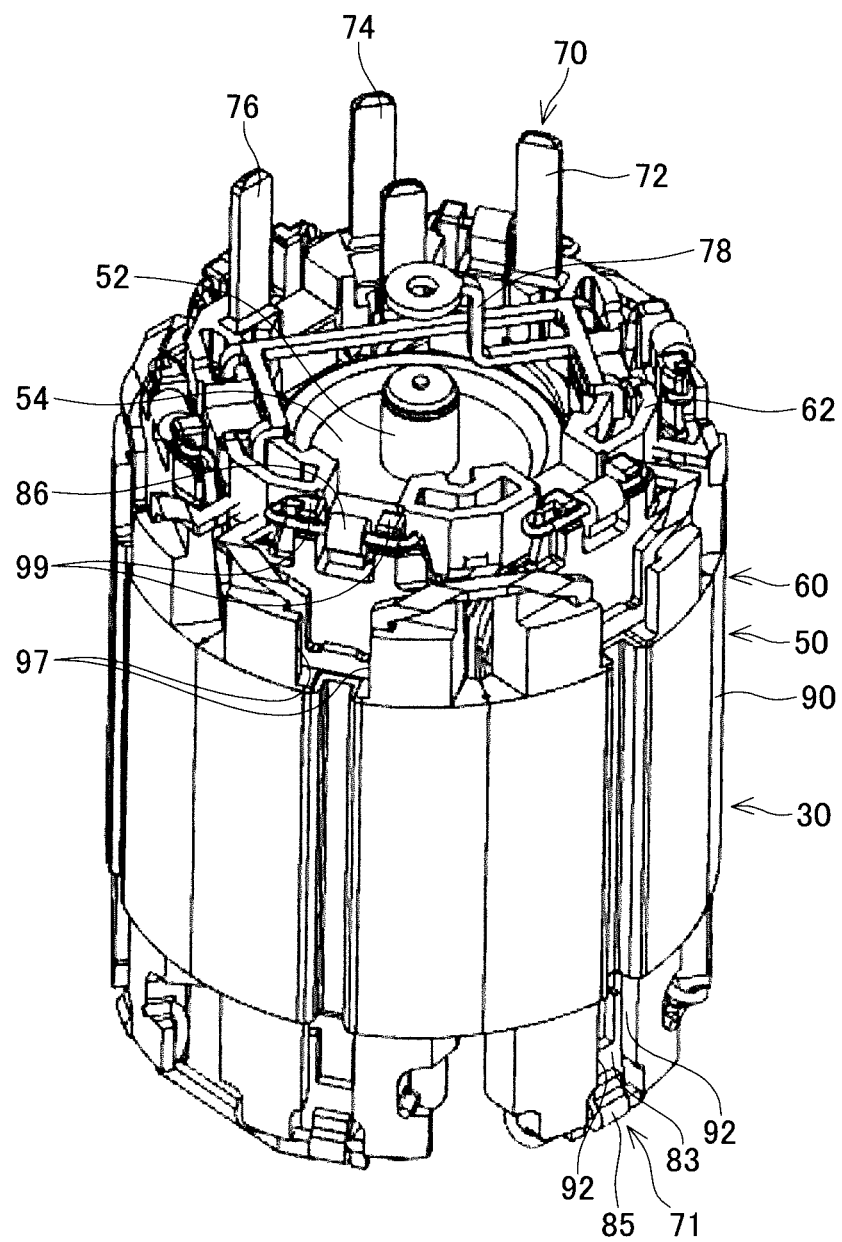
FIG. 1 is a perspective view of a stator and a rotor that are arranged in a fuel pump according to a first embodiment.

The resin layer 64 entirely covers the core 90. As shown in FIG. 1, the resin layer 64 comprises a plurality of (in the present embodiment, six pairs of) upper insertion trenches 97, 97. Further, the resin layer 64 comprises a plurality of (in the present embodiment, six pairs of) coil wire engagement portions 99, 99 (It should be noted that in FIG. 1, only one pair of coil wire engagement portions 99, 99 is given the reference number). The six pairs of upper insertion trenches 97, 97 are placed at regular intervals in a circumferential direction of the annular portion 91 (It should be noted that in FIG. 1, only one pair of upper insertion trenches 97, 97 and one pair of coil wire engagement portions 99, 99 are given the reference numbers). In the circumferential direction of the annular portion 91, each pair of the six pairs of upper insertion trenches 97, 97 is located at the same position as the corresponding one of the six teeth 94. Two upper insertion trenches 97 included in each pair of upper insertion trenches 97, 97 are placed apart from each other in the circumferential direction of the annular portion 91. The upper insertion trenches 97 are provided farther outside the core 90 than the teeth 94 and at an upper end of the stator 60. The upper insertion trenches 97 extend linearly in the vertical direction. Upper ends of the upper insertion trenches 97 are open, whereas, lower ends of the upper insertion trenches 97 are closed. In each pair of the upper insertion trenches 97, 97, one upper insertion trench 97 is open toward the other upper insertion trench 97.

Figure 3:
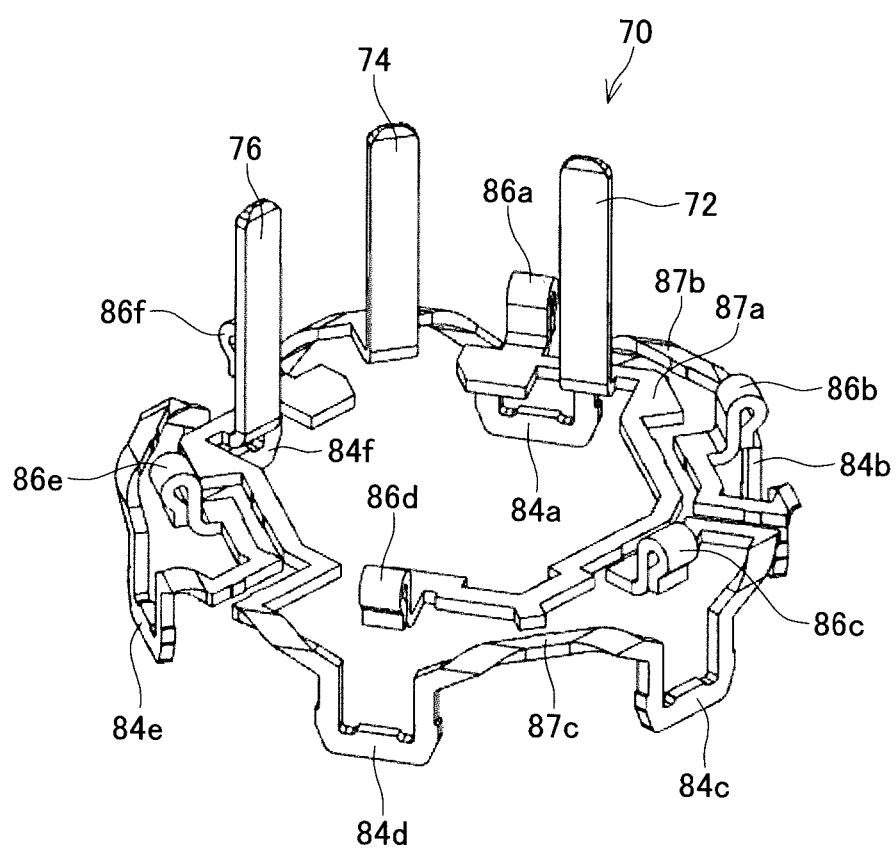
FIG. 3 is a perspective view of a terminal member for a stator according to the first embodiment.

The six pairs of coil wire engagement portions 99, 99 are placed at regular intervals in the circumferential direction of the annular portion 91. In the circumferential direction of the annular portion 91, each pair of the six pairs of coil wire engagement portions 99, 99 is located at the same position as the corresponding one of the six teeth 94. Each pair of the six pairs of coil wire engagement portions 99, 99 is placed above the corresponding pair of upper insertion trenches 97, 97. Two coil wire engagement portions 99 included in each pair of coil wire engagement portions 99, 99 are placed spaced from each other in the circumferential direction of the annular portion 91. Each coil wire engagement portion 99 holds an end of the coil wire 96 wound around the corresponding tooth 94 located at the same position as the coil wire engagement portion 99 in the circumferential direction of the annular portion 91. The coil wire 96 is laid between the coil wire engagement portions 99, 99 in each pair The stator terminal member 70 is placed above the resin layer 64. As shown in FIG. 3, the stator terminal member 70 comprises three supplying terminals 72, 74, and 76, six fitting portions 84a to 84f, six hook portions 86a to 86f, and three joining portions 87a to 87c. FIG. 3 shows a state in which the stator terminal member 70 is attached to the core 90.

In the state described above, the three supplying terminals 72, 74, and 76 are arranged in a ring pattern in a state of being insulated from each other. The three supplying terminals 72, 74, and 76 are insulated from each other by the resin layer 62. Each of the three supplying terminals 72, 74, and 76 is electrically connected to a control circuit 100 (see FIG. 4). The control circuit 100 controls electric power that is supplied to the three supplying terminals 72, 74, and 76. The supplying terminals 72, 74, and 76 are electrically connected to the control circuit 100 via connecting lines 101 to 103, respectively.

The six fitting portions 84a to 84f are placed at regular intervals in a circumferential direction of the core 90. Each of the six fitting portions 84a to 84f is located above the corresponding one of the six teeth 94. The fitting portion 84a is located between the supplying terminal 72 and the supplying terminal 74. In a natural state, a width of each of the fitting portions 84a to 84f is wider than an interval between one pair of the upper insertion trenches 97, 97. As shown in FIG. 1, the stator terminal member 70 is attached to an upper end of the core 90. In this state, each of the six fitting portions 84a to 84f is located between the corresponding pair of the upper insertion trenches 97 of the core 90. That is, each of the fitting portions 84a to 84f is inserted between one pair of the upper insertion trenches 97. Each of the fitting portions 84a to 84f is fitted in one pair of the upper insertion trenches 97 in a state of being elastically deformed in such a direction that the width of each of the fitting portions 84a to 84f becomes narrower.

The six hook portions 86a to 86f are placed above the six fitting portions 84a to 84f respectively. The six hook portions 86a to 86f are placed at regular intervals in the circumferential direction of the core 90. Each of the hook portions 86a to 86f extends upward from an end (hereinafter referred to as "base") on a side of the joining members 87a to 87c, furthermore, curves toward an outer circumference of the stator terminal member 70 downward. It should be noted that ends of the hook portions 86a to 86f on the opposite side to the base are hereinafter referred to as "lower ends". The hook portions 86a to 86f are joined to the coil wires 96. It should be noted that before the hook portion 86a is joined to the coil wires 96, a distance between the base and lower end of the hook portion 86a is greater than a wire diameter of the coil wires 96.

The following describes a procedure for attaching the stator terminal member 70 to the resin layer 64. First, the stator terminal portion 70 is moved toward the resin layer 64 and each of the fitting portions 84a to 84f is inserted into the corresponding upper insertion trenches 97. The stator terminal member 70 is further moved toward the resin layer 64, and then the coil wire 96 supported by one pair of the coil wire engagement portions 99, 99 is inserted into each of the hook portions 86a to 86f. Next, each of the hook portions 86a to 86f is elastically deformed so that the distance between the base and lower end of each of the hook portions 86a to 86f becomes smaller than the diameter of the coil wires 96. Finally, the hook portions 86a to 86f are joined to the coil wires 96 by welding, respectively.

Each of the hook portions 86a to 86f is joined to one of the supplying terminals 72, 74, and 76 by one of the joining members 87a to 87c. In detail, the joining member 87a is bent so as to join the supplying terminal 72 and the hook portions 86a and 86d. The joining portion 87b is bent so as to join the supplying terminal 74, the fitting portions 84a, 84b, 84e, and 84f, and the hook portions 86b and 86e. The joining portion 87c bent so as to join the supplying terminal 76, the fitting portions 84c and 84d, and the hook portions 86c and 86f. In a top view of the stator 60, the joining portions 87a, 87b, and 87c are within an annular region of the core 90. In an area in which the joining portions 87a and 87b overlap in a radial direction of the stator terminal member 70 (hereinafter simply referred to as "the radial direction"), the joining portion 87a is located inside the joining portion 87b in the radial direction. In an area in which the joining portions 87b and 87c overlap in the radial direction, the joining portion 87c is located inside the joining portion 87b in the radial direction. In an area in which the joining portions 87c and 87a overlap in the radial direction, the joining portion 87a is located inside the joining portion 87c in the radial direction.

Figure 5:
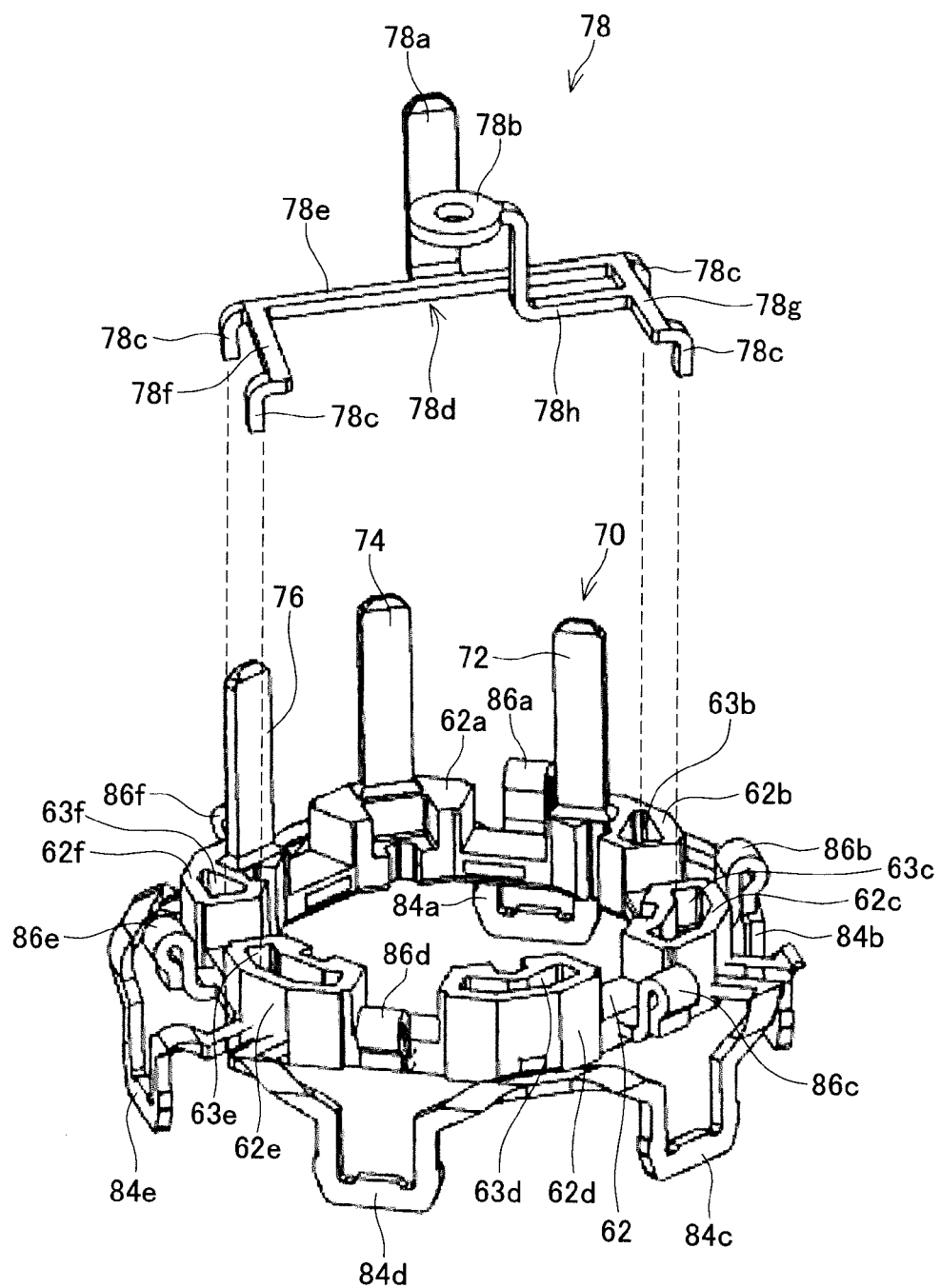
FIG. 5 shows how a ground terminal according to the first embodiment is held by a resin layer.

As shown in FIG. 5, the resin layer 62 is attached to the stator terminal member 70. The resin layer 62 has a ring shape. The resin layer 62 covers the ones of the joining portions 87a to 87c that are located inside in the radial direction. The resin layer 62 does not cover upper parts of the three supplying terminals 72, 74, and 76, the six hook portions 86a to 86f, or the six fitting portions 84a to 84f.

The resin layer 62 comprises six protrusions 62a to 62f. The six protrusions 62a to 62f are placed at regular intervals in the circumferential direction of the core 90. The protrusion 62a is placed between the hook portions 86a and 86f. Similarly, the protrusion 62b is placed between the hook portions 86a and 86b; the protrusion 62c is placed between the hook portions 86b and 86c; the protrusion 62d is placed between the hook portions 86c and 86d; the protrusion 62e is placed between the hook portions 86d and 86e; and the protrusion 62f is placed between the hook portions 86e and 86f. The supplying terminal 74 is located in a center of the protrusion 62a, the supplying terminal 72 is located at an end of the protrusion 62b on a side closer to the supplying terminal 74, and the supplying terminal 76 is located at an end of the protrusion 62f on the side closer to the supplying terminal 74. The protrusions 62a to 62f make it possible to prevent an increase in thickness of the external resin layer 6. As a result, it is possible to prevent defects when the external resin layer 6 is formed. Further, the presence of a space between two adjacent protrusions makes it easy to use a welding electrode to join each of the hook portions 86a to 86f to the corresponding coil wire 96.

The five protrusions 62b to 62f comprise recesses 63b to 63f respectively. The recesses 63b to 63f make it possible to prevent an increase in thickness of the protrusions 62b to 62f in the radial direction. As a result, it is possible to prevent defects when the resin layer 6 is formed.

A ground terminal 78 is placed above the resin layer 62. The ground terminal 78 is made of a conductive material (e.g., a copper alloy). The ground terminal 78 comprises a terminal portion 78a, a contacting portion 78b, four held portion 78c, and a joining portion 78d. The terminal portion 78a has a flat plate shape. As shown in FIG. 2, the terminal portion 78a sticks out above the fuel pump 10. As such, it is possible to electrically connect to the control circuit 100 easily. As shown in FIG. 5, the joining portion 78*d* is connected to a lower end of the terminal portion 78*a*. The joining portion 78*d* comprises plate portions 78*e* to 78*g* and a curving portion 78*h*. At the lower end of the terminal portion 78*a*, the plate portions 78*e* to 78*g* are arranged on a plane perpendicular to the terminal portion 78*a*. The plate portion 78 extends in a linear fashion in both directions from the lower end of the terminal portion 78*a* toward an outer circumference of the core 90. The terminal portion 78*a* is located in a center of the plate portion 78*e*.

One end of the plate portion 78*f* is connected to one end of the plate portion 78*e*. The plate portion 78*f* extends in a direction perpendicular to the plate portion 78*e*. One end of the plate portion 78*g* is connected to the other end of the plate portion 78*e*. The plate portion 78*g* extends in a direction perpendicular to the plate portion 78*e* and parallel to the plate portion 78*f*. The curving portion 78*h* is connected to an intermediate position of the plate portion 78*g*. The curving portion 78*h* extends from the intermediate position of the plate portion 78*g* to be parallel to the plate portion 78*e*, i.e., perpendicularly to the plate portion 78*g*, and curves upward in its midway. The curving portion 78*h* is elastically deformable in the vertical direction.

The contacting portion 78*b* is connected to an upper end of the curving portion 78*h*. The contacting portion 78*b* has a ring and flat plate shape and is located above the shaft 52. The contacting portion 78*b* is placed parallel to the plate portions 78*e*, 78*f*, and 78*g*.

To each of both ends of the plate portion 78, the held portion 78*c* that sticks out from the plate portion 78*f* to an opposite side to the plate portion 78*e* is connected. Each of the two held portions 78*c* extends downward from the plate portion 78*f*. To each of both ends of the plate portion 78*g*, the held portion 78*c* that sticks out from the plate portion 78*g* to the opposite side to the plate portion 78*e* is connected. Each of the two held portions 78*c* extends downward from the plate portion 78*g*.

As shown in FIG. 5, the ground terminal 78 is attached to an upper end of the resin layer 62. Specifically, each of the four held portions 78*c* is inserted in the corresponding one of the recesses 63*b*, 63*c*, 63*e*, and 63*f*. As a result, the ground terminal 78 is held by the resin layer 62. In this state, the ground terminal 78 is insulated from the three supplying terminals 72, 74, and 76 by the resin layer 62. Thus, the ground terminal 78 is integrated with the three supplying terminals 72, 74, and 76, not simultaneously, but after the three supplying terminals 72, 74, and 76 have been integrated first by having the resin layer 62, which is holding the three supplying terminals 72, 74, and 76, hold the ground terminal 78 in a state where the ground terminal 78 is insulated from the supplying terminals 72, 74, and 76. As a result, the ground terminal 78 can be appropriately insulated from the three supplying terminals 72, 74, and 76.

As shown in FIG. 2, in a state where the ground terminal 78 and the stator terminal member 70 are attached to the core 90, and the stator 60 is covered with the external resin layer 6, the contacting portion 78*b* of the ground terminal 78 is in contact with an upper end of a spring 79. A lower end of the spring 79 is in contact with an upper end of a pin 81. A lower end of the pin 81 is in contact with the upper end of the shaft 52. The spring 79 and the pin 81 are made of a conductive material (e.g., stainless steel). As a result, the ground terminal 78 is electrically connected to the shaft 52 via the spring 79 and the pin 81.

As shown in FIGS. 1 and 2, the common terminal 71 is attached to a lower end of the core 90. The common terminal 71 comprises six insertion portions 83 and six hook portions 85. The six insertion portions 83 are placed at intervals from each other in the circumferential direction. Each of the six insertion portions 83 is located below the corresponding one of the six teeth 94. The six insertion portions 83 of the common terminal 71 are respectively attached to lower insertion trenches 92 corresponding to the U-phase teeth 94 (i.e. lower insertion trenches 92 at the same positions as the teeth 94 in the circumferential direction of the annular portion 91), lower insertion trenches 92 corresponding to the V-phase teeth 94, and lower insertion trenches 92 corresponding to the W-phase teeth 94. The six hook portions 85 of the common terminal 71 are welded to the coil wires 96 which are wound around the teeth 94, respectively. Accordingly, the common terminal 71 is electrically connected to the coil wires 96.

Figure 4:
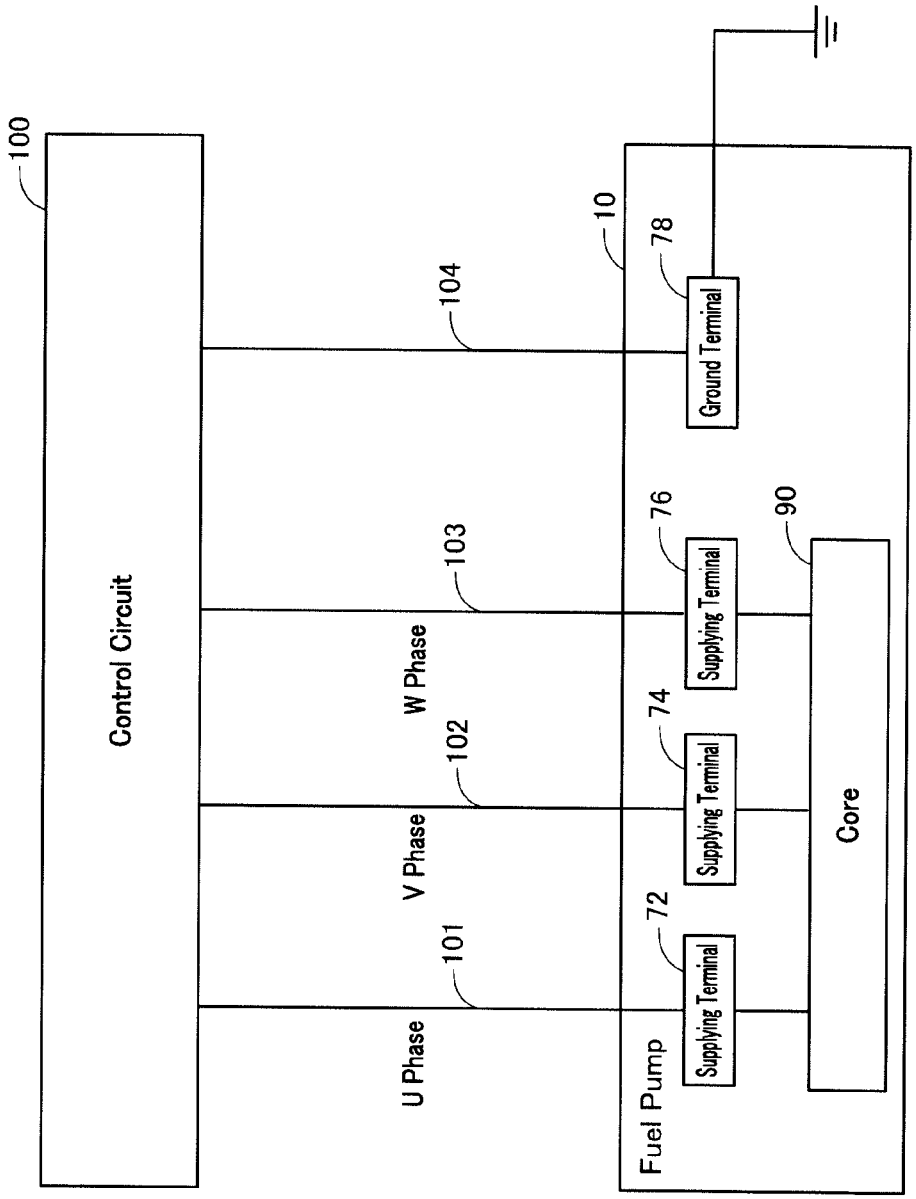
FIG. 4 shows an electrical connection between the fuel pump according to the first embodiment and a control circuit.

As shown in FIG. 4, when an automobile is started, the fuel pump 10 starts to be driven. While the fuel pump 10 is being driven, the control circuit 100 supplies U-, V-, and W-phase electric currents respectively to the motor section 50 at predetermined timing. That is, the control circuit 100 switches between a state of supplying each U-, V-, and W-phase electric power and a state of not supplying each U-, V-, and W-phase electric power (i.e. switching). Due to this, the rotor 54 rotates according to changes in magnetic field formed respectively by the two U-phase teeth 94, the two V-phase teeth 94, and the two W-phase teeth 94. As with the rotor 54, the impeller 34 rotates, and fuel is sucked therein from the inlet 38. The fuel sucked into the impeller 34 is pressurized, introduced into the fuel pump 10 through the communicating hole, and discharged into the fuel passage through the outlet.

The control circuit 100 is grounded to the spring 79, the pin 81, the shaft 52, the casing 32, and the housing 2 via the ground terminal 78. Accordingly, it is possible to suppress switching noise that is generated in the control circuit 100 by switching at timing when the control circuit 100 switches from the state of supplying the electric currents to the state of not supplying the electric currents.

Further, with a configuration where the ground terminal 78 makes contact with the spring 79, and the spring 79 makes contact with the pin 81, it is possible to adjust a position of contact between the ground terminal 78 and the spring 79. In this state, the joining portion 78*d* of the ground terminal 78 and the spring 79 are elastically deformed. The ground terminal 78, and the spring 79 and the pin 81 can be appropriately brought into contact with each other by a restoring force of the joining portion 78*d* (i.e., the ground terminal 78). Further, the shaft 52 and the ground terminal 78 can be prevented from making direct contact with each other.

The fuel pump 10 according to the first embodiment comprises the resin layer 62, which holds the three supplying terminals 72, 74, and 76; and the ground terminal 78, which is held by a fixing member in a stare of being insulating from the three supplying terminals 72, 74, and 76. That is, the ground terminal 78 is held by the resin layer 62, which holds the three supplying terminals 72, 74, and 76, in a state of being insulated from the three supplying terminals 72, 74, and 76. As a result, the ground terminal 78 can be appropriately insulated from the three supplying terminals 72, 74, and 76.

In a state where the ground terminal 78 is grounded, the spring 79 is pressing the pin 81. Accordingly, it is possible to prevent the rotor 54 from floating upward due to vibration caused by its rotation.

(Correspondence Relationship)

The resin layer 62 is an example of the "fixing member." The pin 81 is an example of the "at least one metal member." The joining portion 78d is an example of the "at least a part of the ground terminal." The spring 79 is an example of the "spring member."

Second Embodiment

Figure 6:
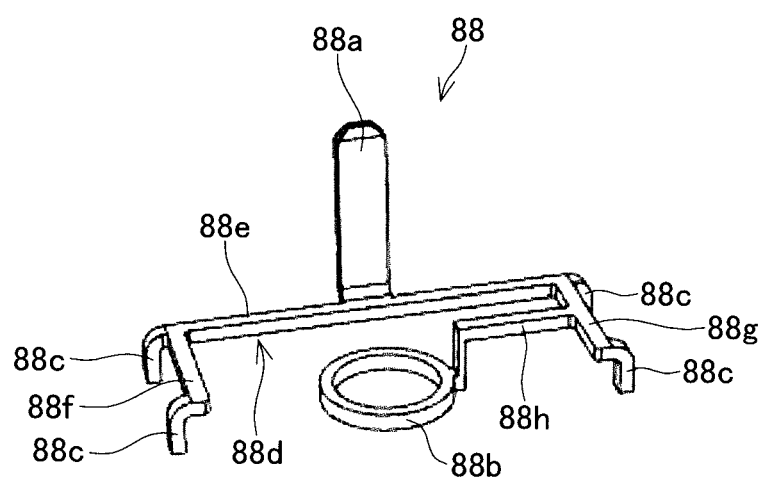
FIG. 6 is a perspective view of a ground terminal according to a second embodiment.

A second embodiment is described with a focus on differences between the first and second embodiments. As shown in FIG. 6, the fuel pump 10 according to the second embodiment comprises a ground terminal 88 instead of the ground terminal 78. The ground terminal 88 is placed above the resin layer 62. The ground terminal 88 is made of a conductive material. The ground terminal 88 comprises a terminal portion 88a, a contacting portion 88b, four held portions 88c, and a joining portion 88d. The terminal portion 88a and the four held portions 88c are identical to the terminal portion 78a and the four held portions 78c of the ground terminal 78, respectively. The joining portion 88d is connected to a lower end of the terminal portion 88a. The joining portion 88d comprises plate portions 88e, 88f, and 88g and a bend portion 88h. The plate portions 88e, 88f and 88g are identical to the plate portions 78e, 78f, and 78g. The bend portion 88h is connected to an intermediate position of the plate portion 88g. The bend portion 88h extends from the intermediate position of the plate portion 88g to be parallel to the plate portion 88e, i.e., perpendicularly to the plate portion 88g, and bends downward in its midway. The bend portion 88h is elastically deformable in the vertical direction.

The contacting portion 88b is connected to a lower end of the bend portion 88h. As with the contacting portion 78b of the ground terminal 78, the contacting portion 88b has a ring-shaped flat plate shape and is located above the shaft 52. The contacting portion 88b is placed parallel to the plate portions 88e, 88f and 88g.

As with the ground terminal 78, the ground terminal 88 is attached to the upper end of the resin layer 62. That is, as in the first embodiment, the three supplying terminals 72, 74, and 76 are integrated first, and then the ground terminal 88 is integrated with the three supplying terminals 72, 74, and 76 which have been already integrated. As a result, the ground terminal 88 can be appropriately insulated from the three supplying terminals 72, 74, and 76.

Figure 7:
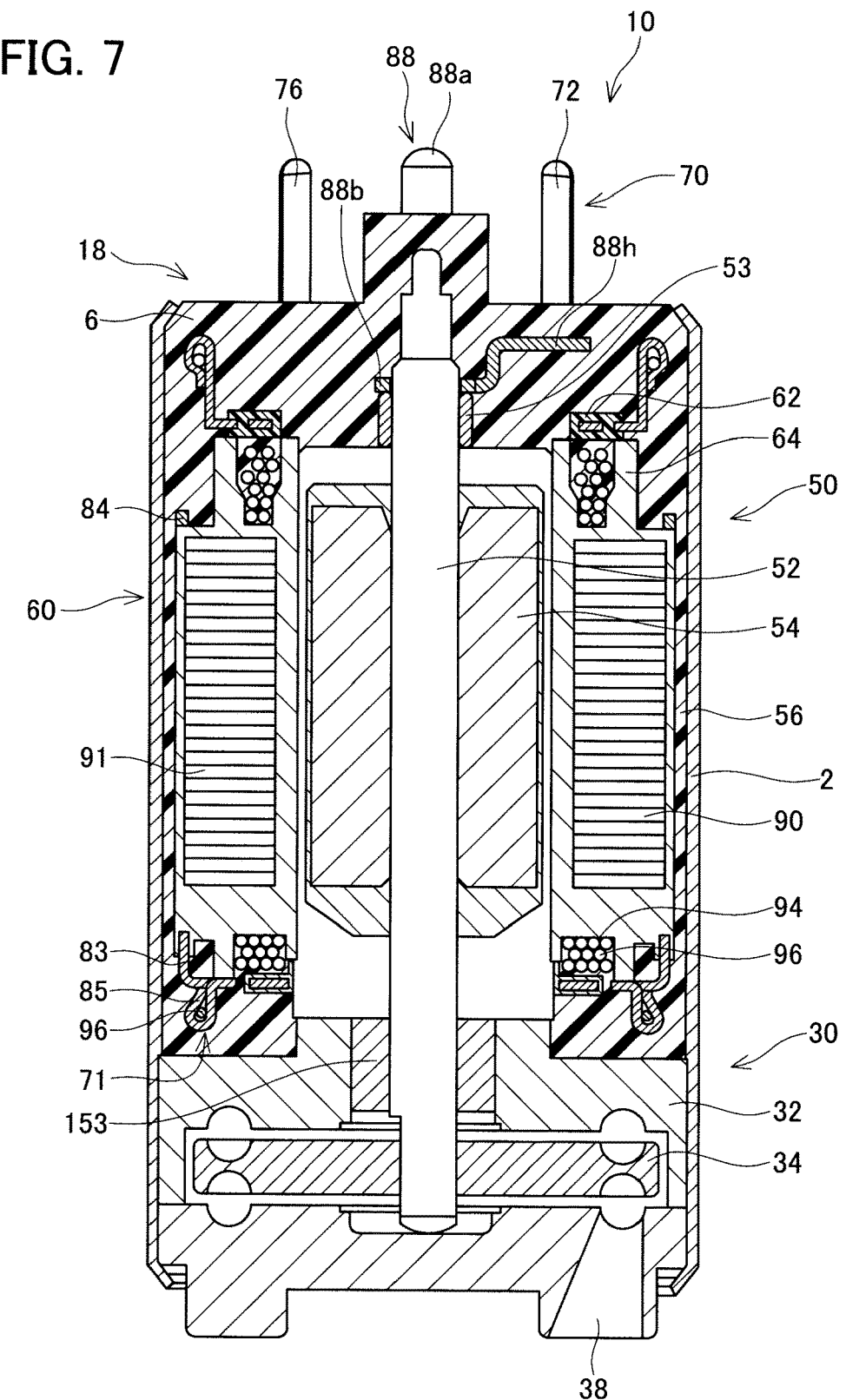
FIG. 7 is a longitudinal sectional view of a fuel pump according to the second embodiment.

As shown in FIG. 7, in a state where the ground terminal 88 and the stator terminal member 70 are attached to the core 90, and the stator 60 is covered with the external resin layer 6, the contacting portion 88b of the ground terminal 88 is in contact with an upper end of the bearing 53. As a result, the ground terminal 88 is electrically connected to the shaft 52 via the bearing 53. Further, in this state, the joining portion 88d is elastically deformed. The ground terminal 88 can be appropriately grounded by a restoring force of the joining portion 88d (i.e., the ground terminal 88).

In the second embodiment, the ground terminal 88 is in direct contact with the bearing 53. Accordingly, there is no need to provide a component for electrically connecting the ground terminal 88 and the bearing 53.

(Correspondence Relationship)

The bearing 53 is an example of the "at least one metal member".

Third Embodiment

Figure 8:
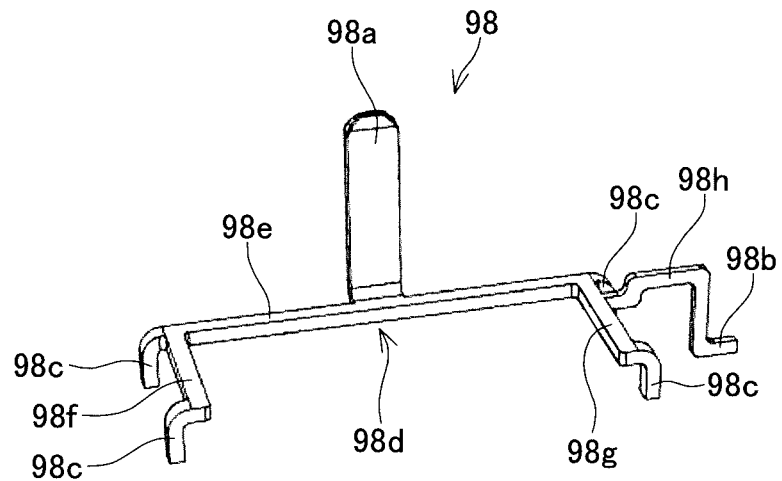
FIG. 8 is a perspective view of a ground terminal according to a third embodiment.

A third embodiment is described with a focus on differences between the first and third embodiments. As shown in FIG. 8, the fuel pump 10 according to the third embodiment comprises a ground terminal 98 instead of the ground terminal 78. The ground terminal 98 is placed above the resin layer 62. The ground terminal 98 is made of a conductive material. The ground terminal 98 comprises a terminal portion 98a, a contacting portion 98b, four held portions 98c, and a joining portion 98d. The terminal portion 98a and the four held portions 98c are identical to the terminal portion 78a and the four held portions 78c of the ground terminal 78, respectively. The joining portion 98d is connected to a lower end of the terminal portion 98a. The joining portion 98d comprises plate portions 98e to 98g and a curving portion 98h. The plate portions 98e to 98g are identical to the plate portions 78e to 78g respectively. The curving portion 98h is connected to an intermediate position of the plate portion 98g. The curving portion 98h extends from the intermediate position of the plate portion 98g perpendicularly to the plate portion 98g toward the outer circumference of the core 90, bends upward in its midway, then extends perpendicularly to the plate portion 98g toward the outer circumference of the core 90 in its midway, and curves downward in its midway. The curving portion 88h is elastically deformable in a radial direction.

The contacting portion 98b is connected to a lower end of the curving portion 98h. The contacting portion 98b has a flat plate shape and is located above the core 90. The contacting portion 98b is placed parallel to the plate portion 98e.

As with the ground terminal 78, the ground terminal 98 is attached to the upper end of the resin layer 62. Accordingly, it is possible to appropriately insulate the ground terminal 98 from the three supplying terminals 72, 74, and 76.

Figure 9:
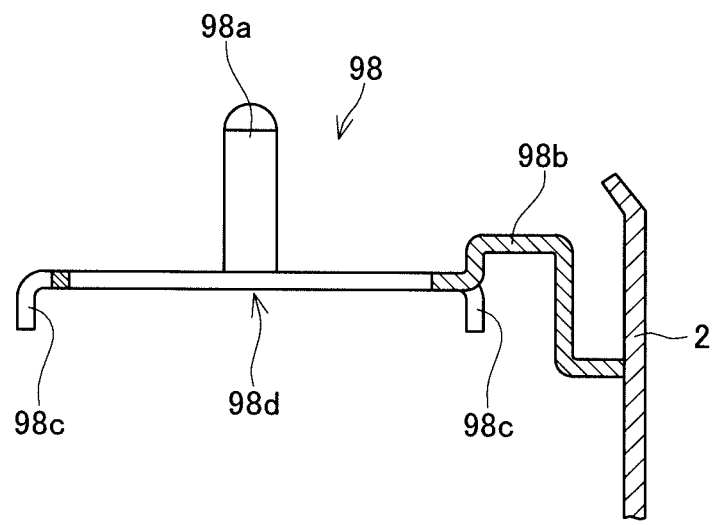
FIG. 9 is a cross-sectional view of a contact portion between the ground terminal according to the third embodiment and a housing.

As shown in FIG. 9, in a state where the ground terminal 98 and the stator terminal member 70 are attached to the core 90, the contacting portion 98b of the ground terminal 98 is in contact with the housing 2. As a result, the ground terminal 98 is electrically connected to the housing 2. Further, in this state, the joining portion 98d is elastically deformed. The ground terminal 98 can be appropriately grounded by a restoring force of the joining portion 98d (i.e., the ground terminal 98).

In the third embodiment, the ground terminal 98 is in direct contact with the housing 2. Accordingly, there is no need to provide a component for electrically connecting the ground terminal 98 and the housing 2.

(Correspondence Relationship)

The housing 2 is an example of the "at least one metal member".

Fourth Embodiment

Figure 10:
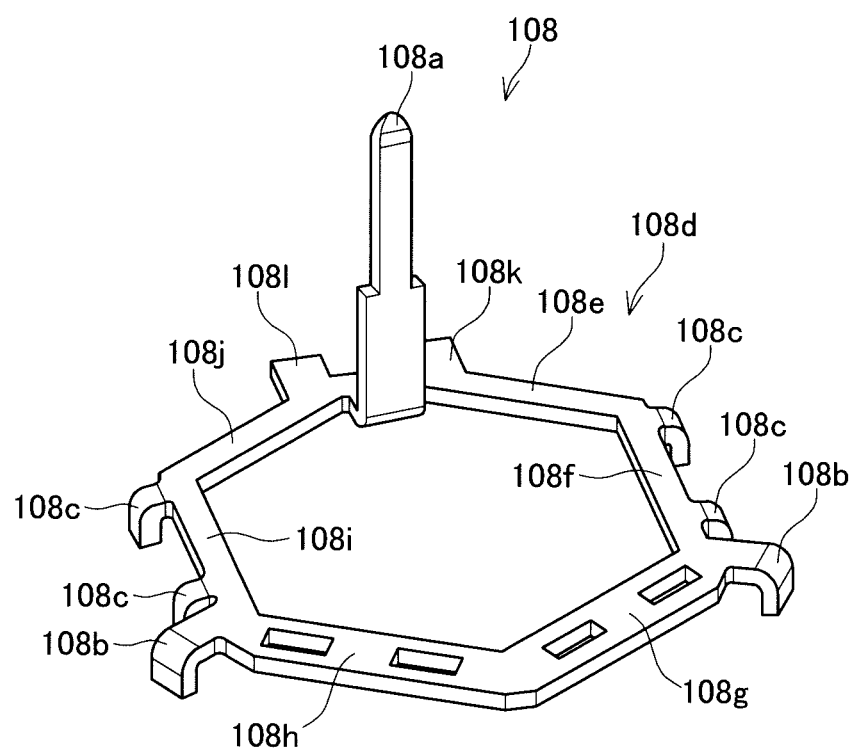
FIG. 10 is a perspective view of a ground terminal according to a fourth embodiment.

A fourth embodiment is described with a focus on differences between the first and fourth embodiments. As shown in FIG. 10, the fuel pump 10 according to the fourth embodiment comprises a ground terminal 108 instead of the ground terminal 78. The ground terminal 108 is placed above the resin layer 62. The ground terminal 108 is made of a conductive material. The ground terminal 108 comprises a terminal portion 108a, two contacting portions 108b, four held portions 108c, and a joining portion 108d. The terminal portion 108a is identical to the terminal portion 78a of the ground terminal 78.

The joining portion 108d comprises plate portions 108e to 108l. At a lower end of the terminal portion 108a, the plate portions 108e to 108l are disposed on a plane perpendicular to the terminal portion 108a. The plate portions 108e to 108j are arranged in the circumferential direction of the core 90 from the lower end of the terminal portion 108*a*. The plate portions 108*e* to 108*j* are arranged in a substantially hexagonal and ring pattern at the lower end of the terminal portion 108*a*. The plate portion 108*k*, which sticks out in an outer circumference direction of the core 90, is connected to an end of the plate portion 108*e* on a terminal portion 108*a* side. The plate portion 108*l*, which sticks out in the outer circumference direction of the core 90, is connected to an end of the plate portion 108*j* on the terminal portion 108*a* side.

Two holes are provided in each of the plate portions 108*g* and 108*h* in the outer circumferential direction of the core 90. Due to this, resin is allowed flow easily passing through the plate portions 108*g* and 108*h* when the external resin layer 6 is formed.

One of the contacting portions 108*b*, which sticks out in the outer circumferential direction of the core 90, is connected to a connection portion between the plate portion 108*f* and the plate portion 108*g*. This contacting portion 108*b* extends from the connection portion toward the outer circumference of the core 90 and curves downward in its midway. Another contacting portion 108*b*, which sticks out in the outer circumferential direction of the core 90, is connected to a connection portion between the plate portion 108*h* and the plate portion 108*i*. This contacting portion 108*b* extends from the connection portion toward the outer circumference of the core 90 and curves downward in its midway. The two contacting portions 108*b* are elastically deformable in the vertical and radial directions.

One of the held portions 108*c*, which sticks out in the outer circumferential direction of the core 90, is connected to a connection portion between the plate portion 108*f* and the plate portion 108*e*. This held portion 108*c* extends downward from the connection portion. Another one of the held portions 108*c*, which sticks out toward the outer circumference of the core 90, is connected to a part of the plate portion 108*f* that is located near the connection portion between the plate portion 108*f* and the plate portion 108*g*. This held portion 108*c* extends downward from the plate portion 108*f*. Yet another one of the held portions 108*c*, which sticks out to the outer circumferential of the core 90, is connected to a connection portion between the plate portion 108*i* and the plate portion 108*j*. This held portion 108*c* extends downward from the connection portion. The other of held portions 108*c*, which sticks out toward the outer circumference of the core 90, is connected to a part of the plate portion 108*i* that is located near the connection portion between the plate portion 108*i* and the plate portion 108*h*. This held portion 108*c* extends downward from the plate portion 108*i*.

Figure 11:
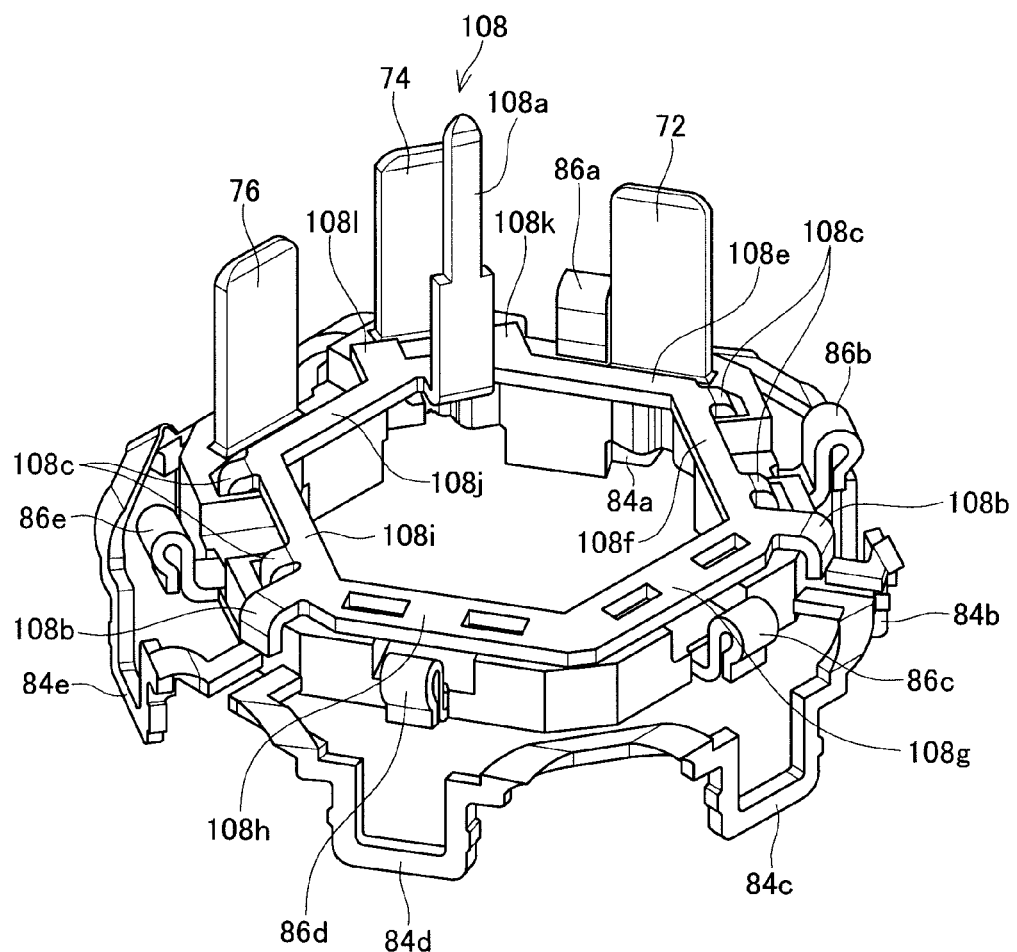
FIG. 11 shows how the ground terminal according to the fourth embodiment is held by a resin layer.

As shown in FIG. 11, as with the ground terminal 78, the ground terminal 108 is attached to the upper end of the resin layer 62. Accordingly, it is possible to appropriately insulate the ground terminal 108 from the three supplying terminals 72, 74, and 76.

Figure 12:
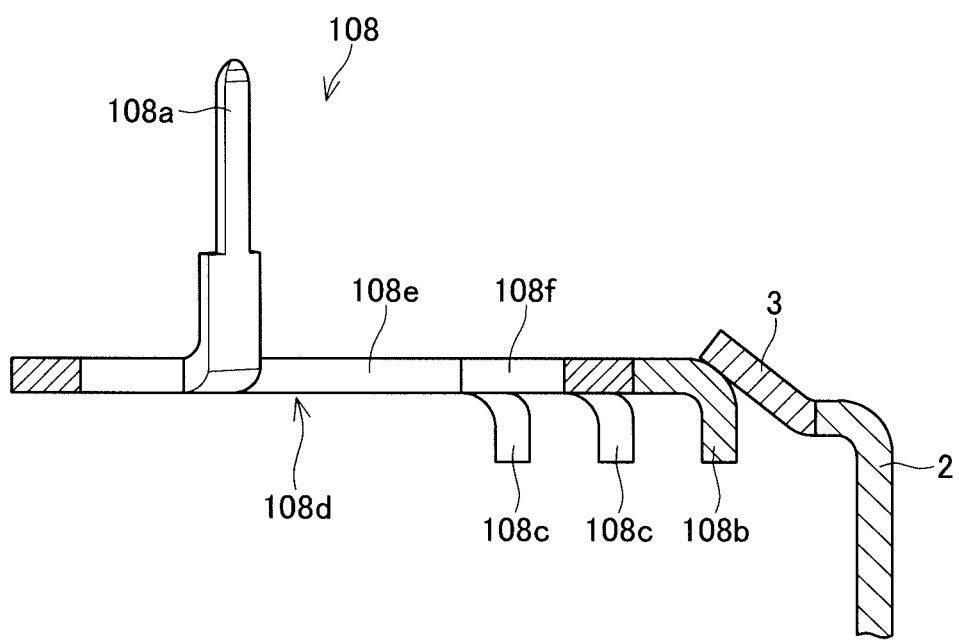
FIG. 12 is a cross-sectional view of a contact portion between the ground terminal according to the fourth embodiment and a housing.

As shown in FIG. 12, the housing 2 comprises two protrusions 3 which stick out inward. It should be noted that FIG. 12 illustrates only one of the protrusions 3. The two protrusions 3 are elastically deformable in the vertical and radial directions. In a state where the ground terminal 108 and the stator terminal member 70 are attached to the core 90, each of the two contacting portions 108*b* of the ground terminal 108 is in contact with the corresponding one of the two protrusions 3. As a result, the ground terminal 108 is electrically connected to the housing 2. Further, in this state, the contacting portions 108*b* and the protrusions 3 are elastically deformed. Thus, the ground terminal 108 can be appropriately grounded by a restoring force of the contacting portions 108*b* and the protrusions 3. Accordingly, it is possible to suppress switching noise that is generated in the control circuit 100 due to switching.

Further, as shown in FIG. 11, the plate portions 108*e* to 108*h* of the ground terminal 108 are arranged along a shape of the resin layer 62 above the resin layer 62. In this configuration, the plate portions 108*e* to 108*h* are located above the joining portion 87*a*, the plate portions 108*i* and 108*j* are located above the joining portion 87*c*, and the plate portions 108*k* and 108*l* are located above the joining portion 87*b*. It should be noted that the joining portions 87*a* to 87*c* conduct between the three supplying terminals 72, 74, and 76 and the core 90. Therefore, the ground terminal 108 electrically shields the joining portions 87*a* to 87*c*. This configuration makes it possible to highly suppress switching noise generated in the control circuit 100 from being emitted from conducting portions to the outside of the fuel pump (so-called emission noise).

In the fourth embodiment, the ground terminal 108 is in direct contact with the housing 2. Accordingly, there is no need to provide a component for electrically connecting the ground terminal 108 and the housing 2.
(Correspondence Relationship)

The joining portions 87*a* to 87*c* are examples of the "conducting portion."

The embodiments of the present invention have been described in detail above; however, these embodiments are merely illustrative and are not intended to limit the scope of the patent claims. Various modifications and alterations to the specific examples described above are encompassed in the technical scope of the patent claims.

(1) In each of the embodiments described above, the fuel pump 10 comprises the three supplying terminals 72, 74, and 76. Alternatively, in a modification, the fuel pump 10 may comprise two or four or more supplying terminals. In this case, the motor section 50 is a brushless motor having a same number of layers as a number of supplying terminals. That is, the "plurality" may only have be an integer of 2 or larger.

(2) In each of the embodiments described above, the ground terminals 78 and 88 are electrically connected to the pin 81 and the bearing 53 respectively, and the ground terminals 98 and 108 are electrically connected to the housing 2. Alternatively, for example, the ground terminals may be electrically connected to a member made of a metal material of the fuel tank in which the fuel pump 10 is placed. That is, the "fuel pump" may not comprise the "at least one metal member." Further, the "ground terminal" may not be in contact with the "at least one metal member" and may not comprise the "contacting portion."

(3) In each of the embodiments described above, the ground terminals 78 and 88 are in direct contact with the pin 81 and the bearing 53 respectively, and the ground terminals 98 and 108 are in direct contact with the housing 2. Alternatively, the ground terminals may be in direct contact with at least one of the shaft 52 and the core 90. That is, the "ground terminal" may only need to be electrically connected to the "at least one metal member".

(4) In each of the embodiments described above, each of the ground terminals 78, 88, 98, and 108 is in contact with the metal member of the fuel pump 10 in a state of being elastically deformed. Alternatively, each of the ground terminals 78, 88, and 98 may be in contact with the metal member of the fuel pump 10 in a state of not being elastically deformed. That is, the "at least a part of the ground terminal"

may be in contact with the "at least one metal member" in a state of not being elastically deformed.

(5) In the first embodiment, the ground terminal 78 comprises the joining portion 78*d*. In a modification, for example, the four held portions 78*c* and the contacting portion 78*b* may each be directly joined to the ground terminal 78 without involving the joining portion 78*d* therebetween. That is, the ground terminal may not comprise the "joining portion." It should be noted that the second to fourth embodiments may be modified in the similar manner.

The technical elements explained in the present description or drawings provide technical utility either independently or through various combinations. The present invention is not limited to the combinations described at the time the claims are filed. Further, the purpose of the embodiments illustrated by the present description or drawings is to satisfy multiple objectives simultaneously, and satisfying any one of those objectives gives technical utility to the present invention.

The invention claimed is:

1. A fuel pump configured to be driven by a brushless motor, the fuel pump comprising:
   a core;
   a plurality of supplying terminals configured to supply electric power to a coil wire fixed to the core and wound around the core;
   a fixing member holding the plurality of supplying terminals; and
   a ground terminal held by the fixing member in a state of being insulated from the plurality of the supplying terminals, wherein the ground terminal is electrically connected to a control circuit configured to control electric power supplied to the plurality of the supplying terminals, wherein:
   the ground terminal is grounded and electrically insulated from the plurality of supplying terminals,
   the fuel pump further comprises a conducting portion configured to conduct between the plurality of the supplying terminals and the coil wire, and
   the ground terminal is disposed along the conducting portion above the conducting portion on a side of the conduct portion opposite to the core.

2. The fuel pump as in claim 1, further comprising at least one metal member, wherein
   the ground terminal is electrically connected to the at least one metal member.

3. The fuel pump as in claim 2, wherein
   the ground terminal is in contact with the at least one metal member in a state where at least a part of the ground terminal is elastically deformed.

4. The fuel pump as in claim 2, further comprising a spring member made of a conductive material, wherein
   the ground terminal is in contact with the spring member, and
   the spring member is in contact with the at least one metal member.

5. The fuel pump as in claim 2, wherein the ground terminal is directly in contact with the at least one metal member.

6. The fuel pump as in claim 1, further comprising at least one metal member, wherein
   the ground terminal comprises:
   a terminal portion sticking out above the fuel pump and configured to electrically connect to the control circuit;
   a contacting portion being in contact with the at least one metal member;
   a held portion held by the fixing member; and
   a joining portion joining the terminal portion, the contacting portion and the held portion.

7. The fuel pump as in claim 6, wherein the joining portion is elastically deformable.

* * * * *